UNITED STATES PATENT OFFICE.

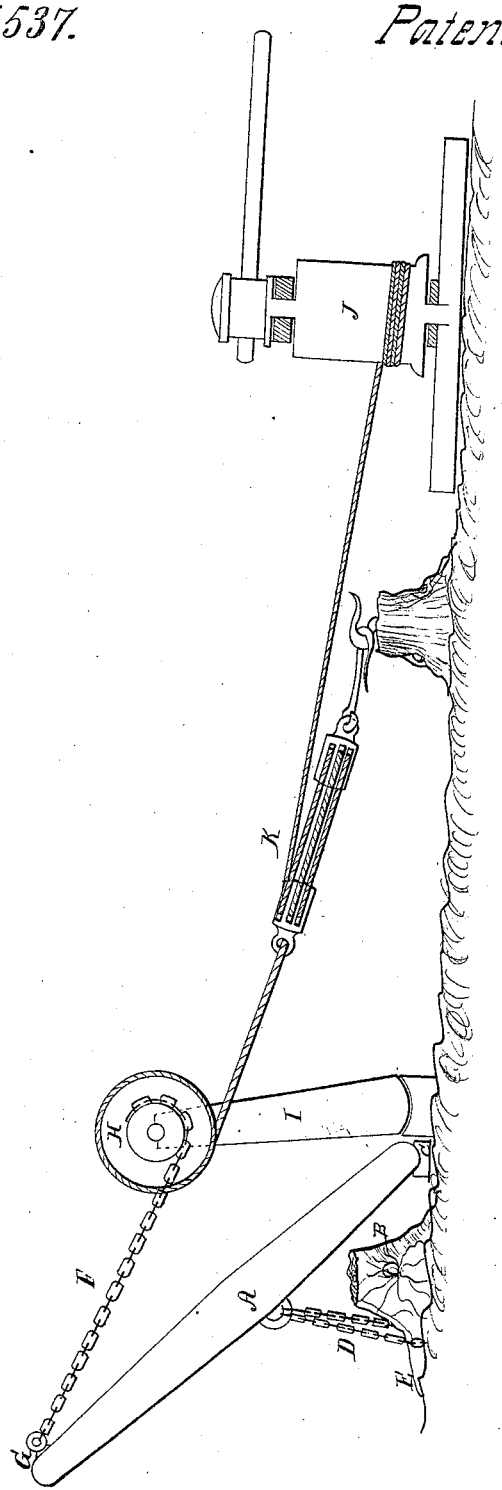

W. O. THOMPSON AND L. HARRINGTON, OF ORANGE, MASSACHUSETTS.

MODE OF EXTRACTING STUMPS.

Specification of Letters Patent No. 15,537, dated August 12, 1856.

*To all whom it may concern:*

Be it known that we, WILLIAM O. THOMPSON, of Orange, in the county of Franklin, State of Massachusetts, and LEONARD HAR-RINGTON, of the city and county of Worcester, State of Massachusetts, have invented a new and Improved Mode of Extracting Stumps; and we do hereby declare that the following is a full and exact description thereof, reference being had to the accompanying drawings and to the letters marked thereon.

The nature of our invention consists in arranging a lever (A) over the stump (B) with its fulcrum (C) on the ground. A connection is made by means of a chain (D) between the root (E) and the lever at some convenient point between its fulcrum and power end. The lever thus arranged is operated by means of chains (F) or their equivalents, fastened to the power end (G) and carried over a pulley (H) working on the top of a working gallows frame (I). Power is then applied to the pulley H by a windlass (J) through the tackle (K).
The peculiar advantages of our machine being in the use of the gallows frame I by which we are enabled both to control at pleasure the direction of the force applied to the stump either to lift it vertically or to give a rolling force or in other words to make the stump or roots on one side to serve as a fulcrum over which to draw out the other; and after starting and loosening the roots the lever A coming in contact with the frame I both operate together as a single lever, with increased velocity lifting the stump clear, thus greatly facilitating the operation.

We do not claim the use of a lever and pulleys or their application to our machine, but

What we claim as new and desire to secure by Letters Patent is,

We claim the combination and arrangement of the lever A and gallows frame I in connection with the pulleys or power applied, when constructed and operating in the manner and for the purposes above set forth and described.

WM. O. THOMPSON.
LEONARD HARRINGTON.

Witnesses:
M. Y. McBAIN,
G. W. HENLY.